FIG-1

INVENTOR.
JAMES R. WILLSON

Feb. 22, 1966 J. R. WILLSON 3,236,448
BAKE AND BROIL BURNER FUEL CONTROL SYSTEMS
Filed Dec. 28, 1961 6 Sheets-Sheet 2

INVENTOR.
JAMES R. WILLSON
BY Robert R Candor
ATTORNEY

Feb. 22, 1966   J. R. WILLSON   3,236,448
BAKE AND BROIL BURNER FUEL CONTROL SYSTEMS
Filed Dec. 28, 1961   6 Sheets-Sheet 3

INVENTOR.
JAMES R. WILLSON
BY
Robert R. Candor
ATTORNEY

INVENTOR.
JAMES R. WILLSON
BY Robert R Candor
ATTORNEY

United States Patent Office 3,236,448
Patented Feb. 22, 1966

1

3,236,448
BAKE AND BROIL BURNER FUEL
CONTROL SYSTEMS
James Robert Willson, Greensburg, Pa., assignor to
Robertshaw Controls Company, Richmond, Va., a corporation of Delaware
Filed Dec. 28, 1961, Ser. No. 162,706
11 Claims. (Cl. 236—15)

This invention relates to improved fuel control systems for gas burners, such as gas burners for domestic ovens and the like, as well as to improved parts for such systems or the like.

A certain type of a conventional domestic gas oven includes a lower bake burner and an upper broil burner. The fuel control system for such oven includes a manually operated selector valve, that thermostatically controls the temperature of the oven, and a three-position selector valve that has an "off" position, a "bake" position and a "broil" position.

In addition, the pilot burner means for the broil burner must have some kind of automatic ignition means because a conventional continuously burning standby pilot burner in the top of the oven would be snuffed out by combustion products produced by the lower bake burner.

Therefore, automatic electric ignition means are normally utilized for igniting the pilot burner for the broil burner of the double burner type oven, the pilot burner, in turn, igniting the main broil burner.

However, electric ignition means requires the use of a re-cycling safety valve that will interconnect the source of fuel with the broil burner only when its pilot burner is ignited.

Such a re-cycling safety valve is also utilized with the main bake burner.

This required use of the re-cycling safety valves further complicates the conventional double burner fuel control system because the three-position selector valve must perform the additional function of diverting fuel from the bake pilot burner to the broil pilot burner when the selector valve is moved to the "broil" position.

This pilot burner valving of the selector valve must be kept separate from the main burner valving because fuel flow to both the bake burner and broil burner is protected by the thermostatically controlled valve of the selector valve.

Accordingly, it is an object of this invention to provide improved fuel control systems for such double burner ovens.

In particular, the bake and broil burners of this invention are controlled from a single selector valve even though both the bake and broil burners have pilot burners that cause safety valves to open only when flames appear at the respective pilot burners so that fuel can only flow to one of the main burners when that particular pilot burner has a flame to ignite the main burner.

In the above fuel control system, the selector valve is adapted to maintain the temperature of the oven at any desired bake temperature.

Further, the fuel control systems of this invention prevent any explosive condition of the broil burner should the selector valve be on the "broil" position thereof and subsequently and rapidly be moved to the "off" position thereof and then back to an "on" position before the safety valve of the broil burner has fully closed.

One of the fuel control systems of this invention of the above type includes means for causing the broil burner to operate when the selector valve is disposed in a "bake" position thereof so that a rotisserie can be utilized in the oven and the temperature of the oven can be maintained at any selected temperature even though the broil burner is being utilized.

2

Other objects, uses and advantages of this invention are apparent from a reading of this description which proceeds with reference to the accompanying drawings forming a part thereof and wherein:

FIGURE 1 is a schematic view illustrating one of the fuel control systems of this invention for a double burner oven or the like.

While the various features of this invention are hereinafter described and illustrated as being incorporated in fuel control systems for a double burner oven or the like, it is to be understood that the various features of this invention could be utilized singly or in any combination in other apparatus, as desired. For example, the single selector valve of this invention can be utilized to control two burners respectively disposed in two ovens.

Therefore, this invention is not to be limited to only the embodiments thereof illustrated in the drawings, because the drawings are merely utilized to illustrate one of the wide variety of uses of this invention.

Figure 1:
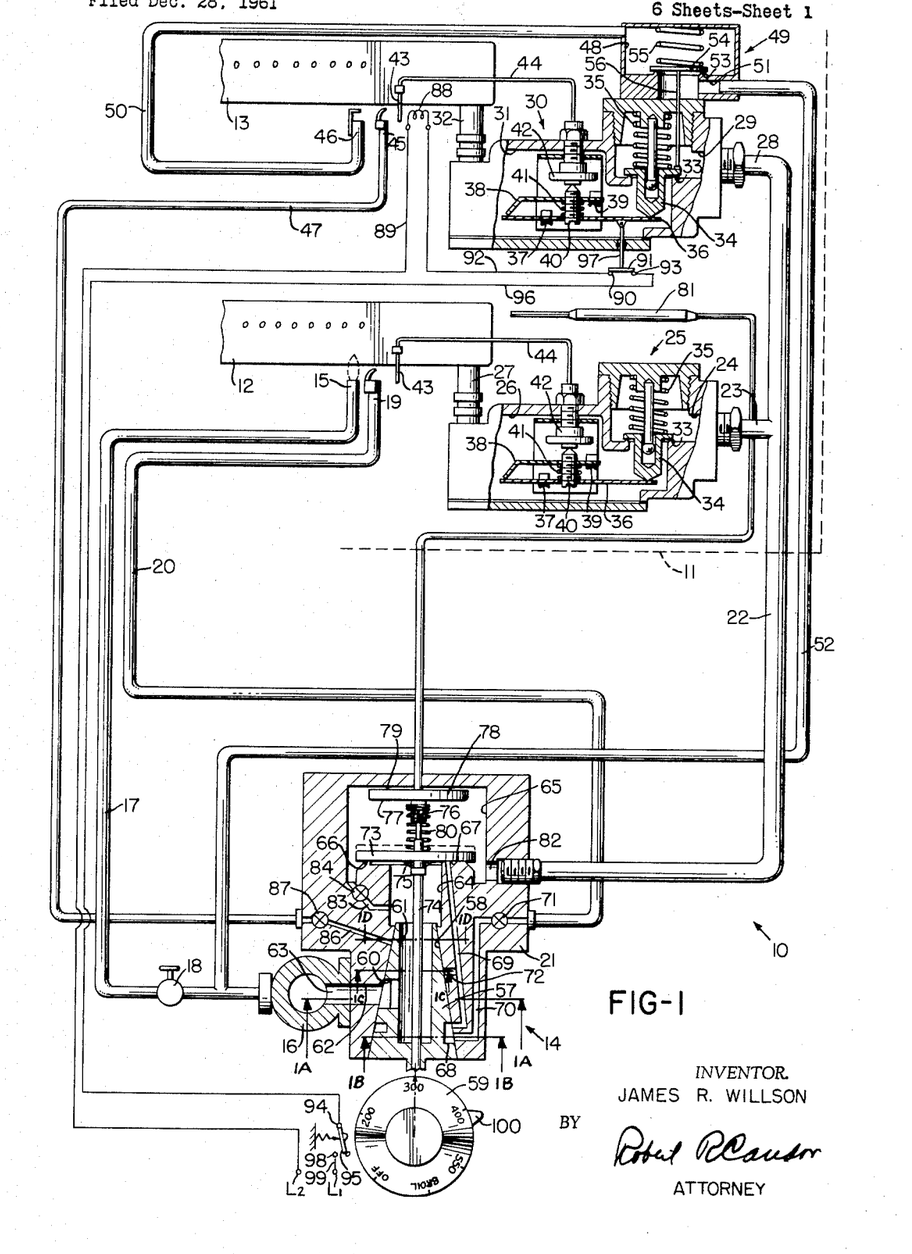
Figure 1A:
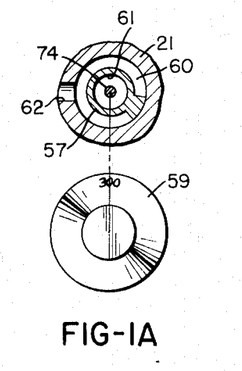
FIGURE 1A is a fragmentary cross-sectional view taken on line 1A—1A of FIGURE 1.
Figure 1B:
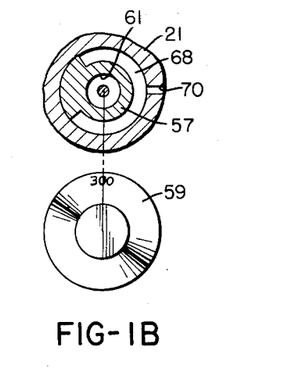
FIGURE 1B is a view similar to FIGURE 1A and is taken on line 1B—1B of FIGURE 1.
Figure 1C:
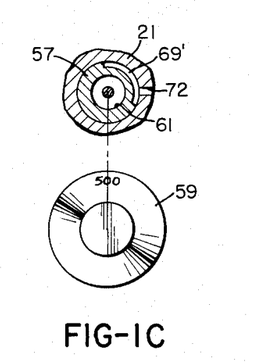
FIGURE 1C is a view similar to FIGURE 1A and is taken on line 1C—1C of FIGURE 1.
Figure 1D:
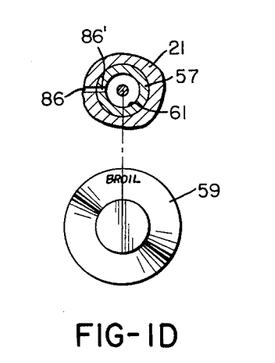
FIGURE 1D is a view similar to FIGURE 1A and is taken on line 1D—1D of FIGURE 1.

Referring now to FIGURE 1, an improved fuel control system of this invention is generally indicated by the reference numeral 10 and includes a conventional domestic gas fired oven 11 having a lower bake burner 12 and an upper broil burner 13 disposed therein in a conventional manner, the fuel for the bake and broil burners 12 and 13 being selectively supplied thereto under the control of a selector valve 14 whereby the bake and broil burners 12 and 13 can be utilized in a conventional manner.

A standby pilot burner 15 is disposed in the oven 11 adjacent the bake burner 12 and is continuously supplied with fuel from a fuel manifold 16 interconnected thereto by a conduit 17, the conduit 17 having a suitable adjusting valve 18 disposed therein.

A controlled pilot burner 19 is disposed adjacent the standby pilot burner 15 and is adapted to receive fuel through a conduit 20 interconnected to a housing 21 of the selector valve 14.

In this manner, the continuously burning standby pilot burner 15 not only will ignite fuel issuing from the bake burner 12, but also will ignite fuel issuing from the controlled pilot burner 19 when the selector valve 14 interconnects the fuel manifold 16 with the conduit 20 in a manner hereinafter described.

Fuel is selectively supplied to the bake burner 12 and broil burner 13 under the control of the selector valve 14 which is adapted to interconnect the fuel manifold 16 to a fuel conduit 22, the conduit 22 having a branch conduit 23 interconnected thereto and leading to an inlet side 24 of a bake burner safety valve 25. The outlet side 26 of the safety valve 25 is interconnected to the bake burner 12 by a conduit 27.

Similarly, the end 28 of the conduit 22 is interconnected to an inlet side 29 of a broil burner safety valve 30, the outlet side 31 of the safety valve 30 being interconnected to the broil burner 13 by a conduit 32.

Each safety valve 25 and 30 has an annular valve seat 33 disposed between the inlet and outlet sides thereof and controlled by a movable valve member 34 in a manner hereinafter described, each valve member 34 being urged to its closed position by a compression spring 35.

Each valve member 34 engages one end of a lever 36 fulcrumed at 37 whereby movement of the lever 36 about the fulcrum 37 causes the valve member 34 to open or close respective valve seat 33.

Another lever 38 is provided in each safety valve 25 and 30 and is fulcrumed at 39 so that one end of the lever 38 bears against an end of the lever 36.

Each lever 38 carries a threaded member or stud 40 passing through a suitable aperture in the respective lever 36 and being encompassed by a compression spring 41 disposed between the respective pair of levers 36 and 38 whereby movement of the stud 40 in an axial direction causes the valve member 34 to move between its opened and closed positions.

A bellows construction 42 is disposed in each safety valve 25 and 30 and has one side thereof fixed to the respective valve 25 or 30 with the other side thereof engaging the stud 40 whereby expansion of the bellows construction 42 causes the respective valve member 34 to open, and contraction of the bellows construction 42 causes the respective valve member 34 to close.

The interior of each bellows construction 42 is interconnected to a sensing bulb 43 by a conduit 44, the sensing bulb 43 carrying a suitable medium which expands in relation to heat, such as mercury or the like.

In particular, the bake burner safety valve 25 is so constructed and arranged that when a flame appears at the controlled pilot burner 19, the medium in the sensing bulb 43 is heated by the flame and expands to cause the bellows construction 42 of the safety valve 25 to expand whereby the valve member 34 of the safety valve 25 is opened to interconnect the conduit 22 to the bake burner 12.

Conversely, when the flame at the controlled pilot burner 19 ceases to exist, the valve member 34 of the bake burner safety valve 25 closes to prevent communication between the bake burner 25 and the source of fuel 16.

Similarly, the safety valve 30 for the broil burner 13 is so constructed and arranged, that the valve 34 thereof opens only when the bulb 43 thereof senses a flame appearing at a controlled pilot burner 45 disposed adjacent the broil burner 13. When a flame ceases to exist at the controlled pilot burner 45, the valve member 34 of the safety valve 30 closes to discontinue communication between the fuel conduit 22 and the broil burner 13 for a purpose hereinafter described.

A standby pilot burner 46 is disposed adjacent the broil burner 13 and is so constructed and arranged that the flame of the standby pilot burner 46 is adapted to ignite fuel issuing from the broil burner 13, the fuel issuing from the standby pilot burner 46 being ignited by the flame of the controlled pilot burner 45 in a manner hereinafter described.

The controlled pilot burner 45 of the broil burner 13 is interconnected to the housing 21 of the selector valve 14 by a conduit 47.

The standby pilot burner 46 of the broil burner 13 is interconnected to an outlet side 48 of a valve 49 by a conduit 50, the inlet side 51 of the valve 49 being interconnected to the conduit 17 by a conduit 52.

The valve 49 has an annular valve seat 53 disposed between the inlet side 51 and the outlet side 48 thereof and controlled by a movable valve member 54 normally urged to the closed position by a compression spring 55. The valve member 54 of the valve 49 is operatively interconnected to the valve member 34 of the broil burner safety valve 30 in any suitable manner, such as by a rod 56, whereby the valve member 54 of the valve 49 is only moved to an open position thereof when the valve member 34 of the safety valve 30 is moved to an open position thereof. Conversely, the valve member 54 of the valve 49 moves to a closed position thereof when the valve member 34 of the broil burner safety valve 30 moves to a closed position thereof.

The selector valve 14 includes a cock valve member 57 rotatably disposed in a tapered bore 58 formed in the housing 21, rotational movement of the valve member 57 being controlled by a selector knob 59 in a manner well known in the art.

The valve member 57 has a slot 60 formed therein and interconnecting the exterior of the valve member 57 with a longitudinally disposed bore 61 formed partially through the valve member 57, the slot 60 of the valve member 57 being rotatably aligned with a passage 62 formed in the housing 21 and interconnected to the manifold 16 by a passage 63.

The slot 60 in the valve member 57 is so constructed that the slot 60 is disposed out of communication with the passage 62 when the control knob 59 is disposed in the "off" position thereof, and is interconnected thereto when the control knob 59 is disposed in any "on" position thereof.

The bore 61 of the valve member 57 is disposed in communication with a chamber 64 formed in the housing 21 of the selector valve 14, the chamber 64 being interconnected to another chamber 65 formed in the housing 21 at an annular valve seat 66.

Another annular valve seat 67 is disposed between the chambers 64 and 65 in an offset relation to the annular valve seat 66 and is disposed in the same plane as the valve seat 66, the valve seat 67 being adapted to be interconnected to a groove 68 formed in the valve member 57 by a passage means 69 formed in the housing 21.

The groove 68 in the valve member 57 is so constructed and arranged that the groove 68 is only interconnected to the passage 69 when the selector knob 59 is disposed in any "on" position between the "off" and "broil" positions thereof for a purpose hereinafter described.

The groove 68 of the valve member 57 is adapted to interconnect the passage 69 to a passage 70 formed in a housing 21 and leading to the controlled pilot burner conduit 20, the passage 70 having a suitable adjusting valve 71 disposed therein to control the flow of fuel through the passage 70.

A branch passage 72 is formed in the housing 21 and interconnects the bore 58 with the passage 69. The valve member 57 has a slot 69', FIGURE 2, formed therein which interconnects the bore 61 of the valve member 57 with the branch passage 72 only when the selector knob 59 is disposed approximately between the 325° F. and 550° F. positions thereof for a purpose hereinafter described.

A thermostatically controlled valve member 73 is disposed in the chamber 65 of the housing 21 and is adapted to open and close the valve seats 66 and 67, the valve member 73 being slidably disposed on a rod or shaft 74.

The rod or shaft 74 is slidably interconnected to the valve member 57 but is adapted to be rotated in unison therewith.

The shaft 74 carries a bi-metal spring means 75 which tends to limit sliding movement of the valve member 73 in one direction on the shaft 74.

The free end of the shaft 74 is threadedly disposed in a retainer 76 carried by the movable wall 77 of a bellows construction 78 disposed in the chamber 65, the other wall 79 of the bellows construction 78 being fixed to the housing 21.

A compression spring 80 is disposed between the retainer 76 and the valve member 73 and tends to urge the valve member 73 toward the valve seats 66 and 67 in opposition to the force of the normally stronger spring means 75.

In this manner, the valve member 73 is maintained against the valve seats 66 and 67 when the selector knob 59 is disposed in the "off" position thereof. However, upon counterclockwise rotation of the selector knob 59 to any bake "on" position thereof, rotation of the valve member 57 causes the rod 74 to be progressively threaded into the retainer 76 whereby the bi-metal means 75 carried by the shaft 74 causes the valve member 73 to move therewith away from the valve seats 66 and 67 in opposition to the spring 80 to interconnect the chambers 64 and 65 of the housing 21 so that fuel can flow through a passage 82 formed in the housing 21 to the bake burner 12 to heat the oven 11.

However, as the temperature of the oven 11 increases to or above the selected temperature setting of the selector knob 59, fluid in a sensing bulb 81 disposed in the oven 11 causes the bellows construction 78 to expand in such a manner that the shaft 74 and valve member 73 move in a direction to cause the valve member 73 to close against the valve seats 66 and 67 to discontinue operation of the bake burner 12.

Thereafter, should the temperature of the oven 11 fall below the selected temperature, the bellows construction 78 collapses to such an extent that the shaft 74 again moves the valve member 73 away from the valve seats 66 and 67 to again cause operation of the bake burner 12.

In this manner, the valve member 73 thermostatically controls the temperature of the oven 11 when the bake burner 12 is being utilized in a manner hereinafter described.

When the selector knob 59 is disposed in the "broil" position thereof the valve member 73 has been moved away from the valve seats 66 and 67 such a distance that, normally the bellows construction 78 does not move the valve member 73 a sufficient distance to close the valve seats 66 and 67 whereby the valve member 73 does not tend to thermostatically control the oven 11 when the broil burner 13 is being utilized in a manner hereinafter described. However, should an excessive temperature be reached in the oven 11, the bellows construction 78 closes the valve member 73 to prevent an excessive temperature in the oven.

Further details of the operation of the valve member 73, shaft 74, bi-metal means 75 and bellows construction 78 can be obtained by reference to the co-pending patent application, Serial No. 152,998, filed November 17, 1961, now Patent No. 3,167,250.

A passage means 83 is formed in the housing 21 and interconnects the chamber 64 with the chamber 65 thereof, the passage 83 having an adjusting valve 84 disposed therein whereby the adjusting valve 84 controls the amount of communication between the chambers 64 and 65.

In this manner, regardless of the position of the thermostatically controlled valve member 73, the passage means 83 maintains a sufficient amount of fuel in the chamber 65 thereof to be fully ignited at the bake burner 12 when the bake burner safety valve 25 is in an opened position thereof.

A passage 86 is formed in a housing 21 of the selector valve 14 and interconnects the controlled pilot conduit 47 to the bore 58, the passage 86 having a suitable adjusting valve 87 disposed therein to control the flow of fluid through the passage 86.

Figure 3:
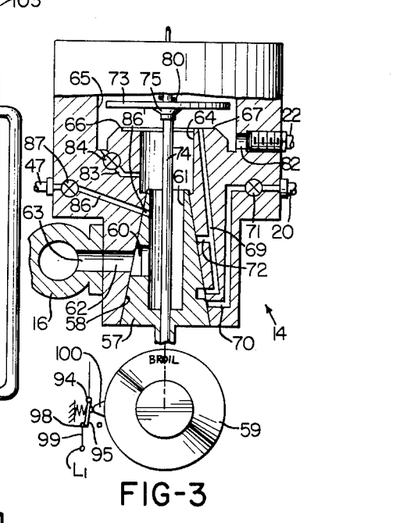
FIGURE 3 is a view similar to FIGURE 2 and illustrates the selector valve in another operating position thereof.

A slot 86', FIGURE 3, is formed in the valve member 57 and is so constructed and arranged that the bore 61 of the valve member 57 is only interconnected to the passage 86 by the slot 86' when the selector knob 59 is disposed in the "broil" position thereof for a purpose hereinafter described.

An electrical ignition system is provided for igniting fuel issuing from the controlled pilot burner 45 of the broil burner 13 and will now be described.

In particular, an electrical ignition coil 88 is disposed adjacent the controlled pilot burner 45 and has one side thereof interconnected to a contact $L_2$ of a suitable electrical power source by a lead 89. The other side of the ignition coil 88 is interconnected to a contact 90 of a movable switch arm 91 by a lead 92.

The other contact 93 of the switch arm 91 is interconnected to a fixed contact 94 of a movable switch arm 95 by a lead 96.

The switch arm 91 is interconnected to the valve member 34 of the broil burner safety valve 30 in any suitable manner, such as by a rod 97 interconnected to the lever 36 thereof, whereby the switch arm 91 is only closed across the contacts 90 and 93 when the valve member 34 of the broil burner safety valve 30 is in a closed position thereof. Thus, the switch arm 91 renders the ignition coil 88 inoperative when the broil burner safety valve 30 is opened because the switch arm 91 is disposed out of contact with the contacts 90 and 93 when the valve member 34 is in an opened position thereof.

The switch arm 95 is normally disposed out of contact with a contact 98, the contact 98 being interconnected to the contact $L_1$ of the electrical power source by a lead 99.

The switch arm 95 is so constructed and arranged that the switch arm 95 is only closed against the contact 98 when the selector knob 59 of the selector valve 14 is disposed in the "broil" position thereof. For example, the control knob 59 can carry a suitable cam 100 which closes the switch arm 95 against the contact 98 only when the control knob 59 is disposed in the "broil" position thereof as illustrated in FIGURE 3.

The operation of the fuel control system 10 will now be described.

When it is desired to maintain the temperature of the oven at a relatively low non-cooking temperature, such as between 140° F. and 325° F., the control knob 59 is rotated in a counterclockwise direction from the "off" position thereof to the desired temperature setting, such as at 300° F. as illustrated in FIGURE 1.

When the control knob 59 is rotated to the position illustrated in FIGURE 1, the cock valve member 57 is likewise rotated whereby the slot 60 comes into communication with the passage means 62 leading from the manifold 16 to interconnect the source of fuel with the bore 61 of the valve member 57. Simultaneously, the groove 68 of the valve member 57 interconnects the passage means 69 with the passage means 70 so that the valve seat 67 is interconnected to the conduit 20 leading to the controlled pilot burner 19 of the bake burner 12.

As the cock valve 57 is rotated, the shaft 74 rotates therewith and is axially moved, through the threaded relation thereof with the retainer 76 of the bellows construction 78, to cause the valve member 73 to move away from the valve seats 66 and 67 to interconnect the chambers 64 and 65 of the selector valve 14.

When the valve member 73 is moved away from the valve seats 66 and 67, not only is the source of fuel interconnected to the fuel conduit 22 leading to the safety valves 25 and 30, but also fuel flows through the valve seat 67, passage means 69, groove 68, passage means 70 and conduit 20 to the controlled pilot burner 19 of the bake burner 12 whereby the flame from the continuously burning standby pilot burner 15 ignites the fuel issuing from the controlled pilot burner 19.

After a flame appears at the controlled pilot burner 19, the sensing bulb 43 of the bake burner safety valve 25 senses the flame at the controlled pilot burner 19 whereby the mercury in the bulb 43 expands and causes the valve member 34 of the bake burner safety valve 25 to open so that fuel can flow from the conduit 22 to the bake burner 12 and be ignited by the standby pilot 15 and/or the controlled pilot burner 19.

As the bake burner 12 is operating to heat the oven 11, the sensing bulb 81 the temperature of the oven 11. When the temperature of the oven 11 approaches or exceeds the selected temperature, the bellows construction 78 of the selector valve 14 has expanded to such an extent that the valve member 73 closes against the valve seats 66 and 67 whereby the flow of fuel to the controlled pilot burner 19 is terminated. Thus, since no flame now appears at the controlled pilot burner 19, the bellows construction 42 of the bake burner safety valve 25 collapses causing the valve member 34 thereof to terminate communication between the fuel conduit 22 and the bake burner 12 so that the bake burner 12 is rendered inoperative.

Should the temperature of the oven 11 fall below the selected temperature, the bellows construction 78 of the selector valve 14 has collapsed to such an extent that the valve member 73 is again opened whereby fuel can flow through the opened valve seat 67 to the controlled pilot 19 to cause a flame to appear at the controlled pilot burner 19. Thus, the safety valve 25 will again open to interconnect the fuel conduit 22 to the bake burner 12.

Thus, it can be seen that the selector valve 14 continuously cycles fuel to the controlled pilot burner 19 to cause periodic operation of the bake burner 12 to maintain the oven 11 at the selected temperature.

Figure 2:
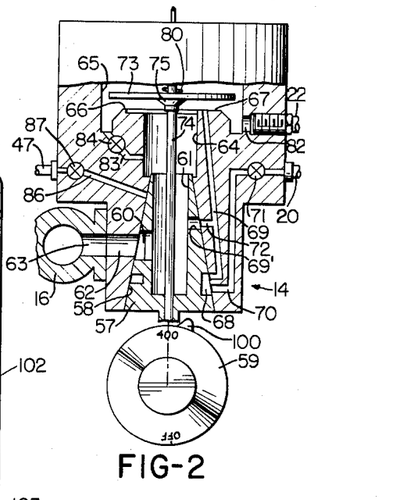
FIGURE 2 is a fragmentary view of the selector valve of the fuel control system of FIGURE 1, the selector valve being in another operating position thereof.

Should it be desired to maintain the oven 11 at a high bake cooking temperature, such as between 325° F. and 550° F., the selector knob 59 is rotated to the selected temperature setting, such as 400° F. as illustrated in FIGURE 2 whereby the slot 69' of the valve member 57 is interconnected with the branch passage means 69 to continuously interconnect the controlled pilot burner 19 of the bake burner 12 with the source of fuel regardless of the position of the thermostatically controlled valve member 73.

In this manner, when the selector knob 59 is disposed in any position between 325° F. and 550° F. a flame will always appear at the controlled pilot burner 19 whereby the safety valve 25 always remains in the opened condition. However, should the temperature of the oven 11 reach or exceed the selected temperature, the bellows construction 78 of the selector valve 14 closes the valve member 73 against the valve seat 66 preventing communication between the chambers 64 and 65 of the selector valve 14 whereby only a limited supply of fuel is delivered to the bake burner 12 through the passage means 83 of the selector valve 14. This bypass fuel delivered by the passage means 83 is insufficient to cause the bake burner 12 to heat the oven 11 above the selected temperature whereby the temperature of the oven 11 falls to the selected temperature.

Thereafter, should the temperature of the oven 11 fall below the selected temperature, the bellows construction 78 causes the valve member 73 to open whereby fuel is again delivered into the chamber 65 to be directed to the bake burner 12. Thus, the valve member 73 thermostatically controls the temperature of the oven 11 in the above manner.

During the above operations of the control system 10 while utilizing the bake burner 12, the ignition means of the broil burner 13 remains dormant because the switch arm 95 is open. No flame appears at the controlled pilot burner 45 whereby the safety valve 30 remains closed preventing communication between the fuel conduit 22 and the broil burner 13 because the passage means 86 of the selector valve 14 is closed from communication with the source of fuel by the valve member 57.

However, should it be desired to broil food in the oven 11, the selected knob 59 is rotated to the "broil" position as illustrated in FIGURE 3 whereby communication between the passage means 69 and 70 thereof is terminated because the slot 68 is moved out of communication with the passage means 70 so that no fuel can flow to the controlled pilot burner 19 of the bake burner 12. In this manner, the safety valve 25 remains closed because no flame appears at the controlled pilot burner 19.

When the valve member 54 of the selector valve 14 is rotated to the "broil" position, the slot 86' thereof interconnects the bore 61 of the valve member 54 with the passage means 86 leading to the controlled pilot burner 45 of the broil burner 13 whereby fuel can issue from the controlled pilot burner 45.

Simultaneously, the selector knob 59, through the cam 100 thereof, closes the switch arm 95 against the contact 98 to interconnect the source of electrical power to the ignition coil 88 whereby the ignition coil 88 ignites the fuel issuing from the controlled pilot burner 45.

The resulting flame at the controlled pilot burner 45 is sensed by the bulb 43 of the broil burner safety valve 30 whereby the bellows 42 thereof is expanded to open the valve member 34 and interconnect the fuel conduit 22 to the broil burner 13.

As the valve member 34 of the broil burner safety valve 30 opens, the source of electrical power is disconnected from the ignition coil 88 because the switch arm 91 opens simultaneously with the opening of the valve member 34 of the safety valve 30.

Similarly, as the valve member 34 of the safety valve 30 opens, the valve member 54 of the valve 49 opens causing communication between the fuel conduit 52 and the conduit 50 whereby fuel can issue from the standby pilot burner 46 and be ignited by the controlled pilot burner 45, the standby pilot burner 46 and/or the controlled pilot burner 45 igniting the fuel now issuing from the broil burner 13.

Since the valve member 73 of the selector valve 14 has been moved away from the valve seat 66 by rotation of the shaft 74 a substantial distance, the temperature of the oven 11, while the broil burner 13 is operating, is such that the valve member 73 will not normally close during the broiling operation of the oven 11 whereby the source of fuel is continuously interconnected to the fuel conduit 22 and can pass through the opened safety valve 30 to the broil burner 13.

When it is desired to stop the broiling operation, the selector knob 59 is rotated away from the "broil" position thereof whereby communication between the bore 61 of the valve member 57 and the passage 86 thereof is terminated because the slot 86' is moved out of communication with the passage 86. Thus, no more fuel can pass to the controlled pilot burner 45 whereby the safety valve 30 begins to close.

Because there is a time lag in the closing of the valve member 34 of the safety valve 30 when the flame disappears at the controlled pilot burner 45, fuel can still pass from the fuel conduit 22 into the broil burner 13 and be burned thereby.

Because of this time lag in the closing of the valve member 34 of the safety valve 30 after the flame has disappeared from the controlled pilot burner 45, it has been found that an explosive condition would exist at the broil burner 13 should a person be operating the broil burner 13 and subsequently turn the control knob 59 to the "off" position thereof so that no fuel can pass to the broil burner 13 whereby the flame at the broil burner 13 would terminate. Immediately thereafter, the person could again turn the selector knob 59 to any "on" position thereof whereby fuel would again pass to the broil burner 13 through the opened safety valve 30 which would not be ignited because the ignition means 88 is rendered inoperative by the still opened switch arm 91. Further, the controlled pilot burner 45 would not ignite such fuel because there would be no flame at the controlled pilot burner 45.

However, because the valve 49 of this invention is provided, it can be seen that the valve member 54 thereof will remain open as long as the valve member 34 of the safety valve 30 remains open whereby fuel is continuously supplied by the conduit 52 to the conduit 50 leading to the standby pilot burner 46.

Thus, during the broiling operation, a flame will appear at the standby pilot burner 46 and this flame will remain as long as the valve member 34 of the safety valve 30 remains open even if selector knob 59 is turned to the "off" position thereof.

Thus, if the person should again turn the selector knob 59 to a "on" position while the valve member 34 of the safety valve 30 is still in an opened position thereof, the flame issuing from the standby pilot burner 46 will ignite any fuel subsequently issuing from the broil burner 13 so that no explosive condition can exist in the oven 11 should the control knob 59 be manipulated in the above manner.

Once the valve member 34 of the safety valve 30 has fully closed, and thereby prevents any fuel from being directed to the broil burner 13 until the flame appears at the controlled pilot burner 45 thereof, the valve member 54 of the valve 49 also closes terminating the flow of fuel to the standby pilot burner 46 whereby the flame at the standby pilot burner 46 is terminated.

Therefore, it can be seen that the fuel control system 10 of this invention readily permits the operation of a double burner oven by a single selector valve 14 in a manner heretofore unattainable in double burner oven control systems.

Figure 4:
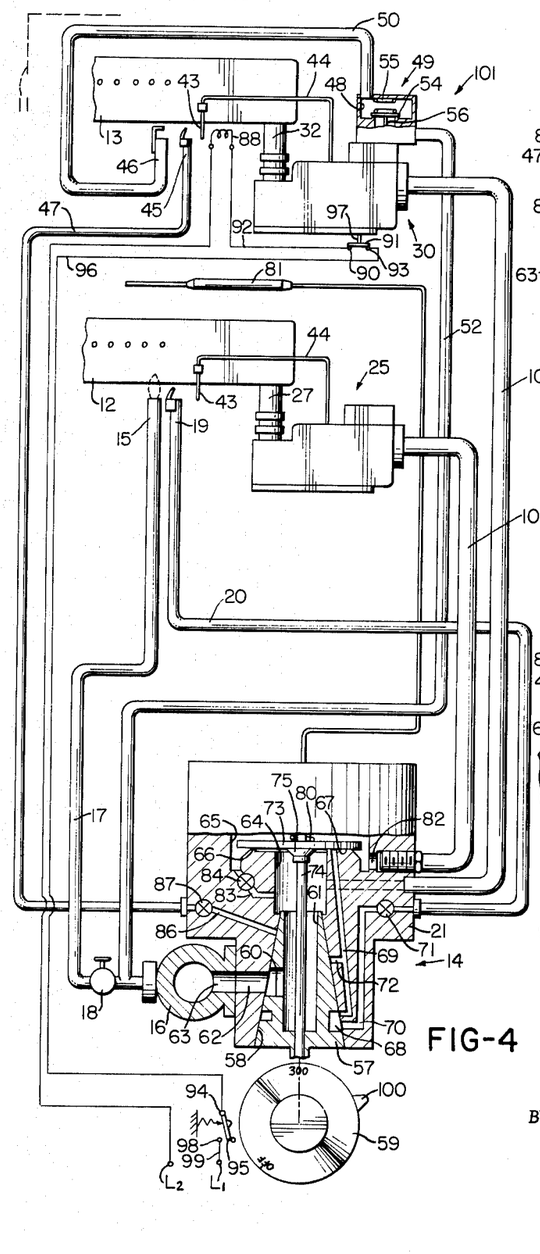
FIGURE 4 is a view similar to FIGURE 1 and illustrates another fuel control system of this invention.

Another fuel control system of this invention for a double burner oven is generally indicated by the reference numeral 101 in FIGURE 4 and like parts are indicated by like reference numerals.

The basic difference between the fuel control system 101 of FIGURE 4 and the fuel control system 10 of FIGURE 1 is that the selector valve 14 of the fuel control system 101 has the chamber 64 thereof continuously interconnected to the inlet side of the broil burner safety valve 30 by a conduit 102 while the chamber 65 of the selector valve 14 is continuously interconnected to the inlet side of the bake burner safety valve 25 by a conduit 103.

Thus, it can be seen that the operation of the fuel control system 101 is substantially the same as the operation of the fuel control system 10 previously described except that when the control knob 59 of the fuel control system 101 is disposed in the "broil" position thereof the amount of communication between the source of fuel and the conduit 102 leading to the broil burner safety valve 30 is not influenced by the relative position of the thermostatically controlled valve member 73 of the selector valve 14 as in a fuel control system 10 previously described.

Figure 5:
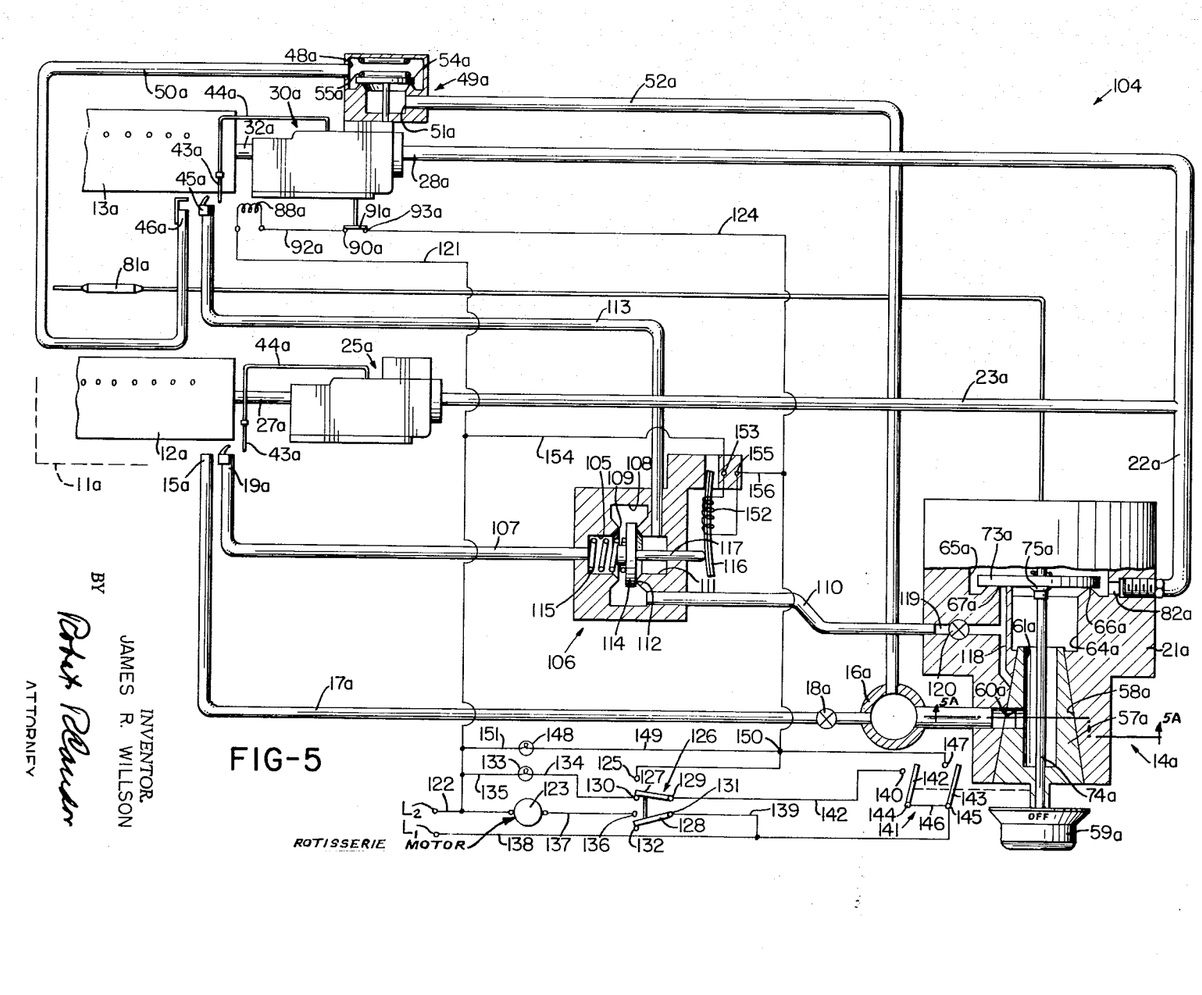
FIGURE 5 is a view similar to FIGURE 1 and illustrates still another fuel control system of this invention.
Figure 5A:
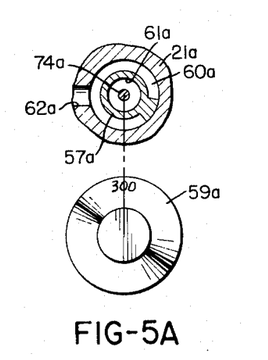
FIGURE 5A is a view similar to FIGURE 1A and is taken on line 5A—5A of FIGURE 5.

Another double oven burner fuel control system of this invention is generally indicated by the reference numeral 104 in FIGURE 5 and parts thereof similar to the fuel control system 10 illustrated in FIGURE 1 are designated by like reference numerals followed by the reference letter "a."

In particular, the bake burned 12a is interconnected to the outlet side of the bake burner safety valve 25a by a conduit 27a, the inlet side of the bake burner safety valve 25a being interconnected to the fuel conduit 22a by the branch conduit 23a.

Similarly, the broil burner 13a is interconnected to the outlet side of the broil burner safety valve 30a by the conduit 32a, the inlet side of the broil burner safety valve 30a being interconnected to the end 28a of the fuel conduit 22a.

The standby pilot burner 15a of the bake burner 12a is interconnected to the fuel manifold 16a by the conduit 17a, the conduit 17a having a suitable regulator valve 18a disposed therein.

The standby pilot burner 46a of the broil burner 13a is interconnected to the outlet side of the valve 49a by the conduit 50a, the inlet side of the valve 49a being interconnected to the manifold 16a by the conduit 52a.

The controlled pilot burner 19a of the bake burner 12a is interconnected to a chamber 105 of a valve 106 by a conduit 107, the valve 106 having another chamber 108 separated from the chamber 105 by an annular valve seat 109.

The chamber 108 of the valve 106 is interconnected to the housing 21a of the selector valve 14a by a conduit 110.

The valve 106 has another chamber 111 formed therein and separated from the central chamber 108 thereof by an annular valve seat 112, the chamber 111 being interconnected to the controlled pilot burner 45a of the broil burner 13a by a conduit 113.

A movable valve member 114 is disposed in the chamber 108 of the valve 106 and is normally urged against the valve seat 112 by a compression spring 115 whereby communication is normally maintained between the conduits 110 and 107 to interconnect the selector valve 14a with the control pilot burner 19a of the bake burner 12.

A bi-metallic member 116 is carried by the valve 106 and engages a push rod 117 disposed against the movable valve member 114.

When the bi-metallic member 116 is heated in a manner hereinafter described, the bi-metallic member 116 moves the valve member 114 to the left in opposition to the force of the compression spring 115 to cause the valve member 114 to close against the valve seat 109 to terminate communication between the conduit 110 and the conduit 107 while simultaneously causing communication between the conduit 110 and the conduit 113 leading to the controlled pilot burner 45a of the broil burner 13a for a purpose hereinafter described.

The selector valve 14a is substantially identical to the selector valve 14 previously described and has the annular valve seat 66a disposed between the chambers 64a and 65a thereof, the smaller annular valve seat 67a being interconnected to a passage means 118 leading to the bore 58a of the housing 21a. In this manner, the thermostatically controlled valve member 73a of the selector valve 14a opens and closes the valve seat 66a and 67a in the manner previously described in response to the temperature of the oven 11a as sensed by the sensing bulb 81a.

The conduit 110 is interconnected to the passage 118 of the selector valve 14a by a branch passage means 119 formed in the housing 21a and having a suitable adjustable valve 120 disposed therein.

The valve member 57a of the selector valve 14a has the bore 61a thereof interconnected to the manifold 16a by the slot 60a when the control knob 59a is disposed in any "on" position thereof.

Further, the valve member 57a has a slot (not shown) which interconnects the bore 61a thereof with the passage 118 when the control knob 59a is disposed in any bake "on" position thereof between approximately 325° F. and 550° F. for a purpose hereinafter described.

The electrical ignition coil 88a for the broil burner 13a has one side thereof interconnected to a lead 121 which is connected to a lead 122, the lead 122 in turn being interconnected to the contact $L_2$ of a suitable electrical power source while the other end of the lead 122 is interconnected to one side of a rotisserie motor 123 utilized to operate a suitable rotisserie adapted to be mounted in the oven 11a in a manner conventional in the art.

The other side of the ignition coil 88a is interconnected to the contact 90a of the switch arm 91a by a lead 92a, the switch arm 92a being operated by the broil burner safety valve 30a in the above manner.

The other contact 93a of the switch arm 91a is interconnected to a lead 124 interconnected to a contact 125 of a double throw switch 126 having two arms 127 and 128 movable in unison.

The arm 127 of the switch 126 is interconnected to a fixed contact 129 and is normally disposed against a contact 130. The arm 128 of the switch 126 is interconnected to a fixed contact 131 and is normally disposed against a contact 132.

The contact 130 of the switch 126 is interconnected to one side of a bake indicating light 133 by a lead 134, the other side of the bake indicating light 133 being interconnected to the lead 121 by a lead 135.

A fourth contact 136 of the switch 126 is interconnected to the other side of the rotisserie motor 123 by a lead 137.

In this manner, when the arms of the switch 127 and 128 are moved manually or automatically from the position illustrated in FIGURE 5 to the other operating position thereof, the arm 127 interconnects the contact 129 with the contact 125 while the arm 128 connects the contact 131 with the contact 136, the contact 131 being interconnected to a lead 138 by a lead 139 with the lead 138 being interconnected to the contact $L_1$ of the electrical power source.

The contact 129 of the switch 126 is interconnected to a contact 140 of a switch 141 by a lead 142, the switch 141 comprising two arms 142 and 143 respectively interconnected together at the fixed contacts 144 and 145 thereof by a lead 146 with the contact 145 being interconnected to the lead 138.

The arms 142 and 143 of the switch 141 are operated by the selector knob 59a of the selector valve 14a in the following manner.

The arm 142 of the switch 141 remains out of contact with the contact 140 as long as the selector knob 59a is disposed in the "off" position thereof or in the "broil" position thereof whereby the arm 142 is only disposed against the contact 140 when the selector knob 59a is disposed on any bake "on" position thereof.

The arm 143 of the switch 141 remains out of contact with a contact 147 as long as the selector knob 59a is disposed in any position thereof other than "broil." When the selector knob 59a is disposed in the "broil" position, the arm 143 makes contact with the contact 147 for a purpose hereinafter described, the contact 147 being interconnected to one side of a broil indicating light 148 by a lead 149 which is interconnected to the lead 124 at 150. The other side of the broil indicating light 148 is interconnected to the lead 121 by a lead 151.

A suitable heating coil or means 152 for controlling the position of bi-metal member 116 has one side 153 thereof interconnected to the lead 121 by a lead 154, the other side 155 of the heater means 152 being interconnected to the lead 124 by a lead 156.

The operation of the fuel control system 104 will now be described.

Assuming that it is desired to operate the oven 11a at a low non-cooking temperature, the control knob 59a is rotated to any selected temperature between 140° F. and 325° F. whereby the valve member 73a is moved away from the valve seats 66a and 67a to interconnect the source of fuel with the conduit 22a and passage means 118. The fuel issuing through the passage means 118 is interconnected to the conduit 110 by the passage 119 whereby the fuel flows through the chambers 108 and 105 of the valve 106 to the conduit 107 leading to the controlled pilot burner 19a to be ignited by the continuously burning flame at the standby pilot burner 15a. When a flame appears at the controlled pilot burner 19a, the flame is sensed by the bulb 43a of the bake burner safety valve 25a whereby the safety valve 25a opens to interconnect the source of fuel to the bake burner 12a which is ignited by the standby pilot burner 15a and/or the controlled pilot burner 19a.

When the temperature of the oven 11a reaches the selected temperature or exceeds the same, the control valve 73a closes against the valve seats 66a and 67a and thereby terminates communication between the source of fuel and the fuel conduit 22a and between the source of fuel and the controlled pilot burner 19a whereby the flame at the controlled pilot burner 19a disappears. When no flame exists at the controlled pilot burner 19a, the safety valve 25a closes in the above manner.

When the temperature of the oven 11a falls below the selected temperature, the valve member 73a moves away from the valve seats 66a and 67a to again interconnect the source of fuel with the fuel conduit 22a and the controlled pilot burner 19a to cause a flame to appear at the controlled pilot burner 19a and open the safety valve 25a in the above manner.

Therefore, it can be seen that the thermostatically controlled valve member 73a of the selector valve 14 maintains the oven 11a at the selected temperature.

When it is desired to operate the oven 11a at a high baking temperature, such as between 325° F. and 550° F., the control knob 59a is rotated to such a temperature setting to cause the slot (not shown) formed in the valve member 57a to interconnect the bore 61a thereof with the passage 118 whereby fuel is continuously supplied to the controlled pilot burner 19a regardless of the position of the valve member 73a so that the safety valve 25a remains open. However, the valve member 73a controls the amount of fuel delivered to the bake burner 12a to maintain the temperature of the oven 11a at the selected temperature in the above manner.

When the control knob 59a of the selector valve 14a is turned to any bake "on" position thereof, the arm 142 of the switch 141 thereof closes against the contact 140 so that the bake indicating light 133 is placed across the contacts $L_1$ and $L_2$ of the source of electric power to indicate that the oven is on a "bake" position thereof, the switch 126 normally being disposed in the position illustrated in FIGURE 5.

When it is desired to use the oven 11a for broiling purposes, the control knob 59a is rotated to the "broil" position thereof whereby the valve member 73a is moved away from the valve seat 66a to interconnect the source of fuel with the closed broil burner safety valve 30a.

Simultaneously with the movement of the selector knob 59a to the "broil" position thereof, the arm 143 of the switch 141 closes against the contact 147 to not only interconnect the broil indicating light 148 across the contacts $L_1$ and $L_2$ of the electrical power source, but to also connect the ignition coil 88a and the heater coil 152 across the contacts $L_1$ and $L_2$ of the electrical power source.

When the heater coil 152 is so energized, the heater coil 152 causes the bi-metal member 116 to move the valve member 114 to the left against the seat 109 to close off communication between the conduits 110 and 107 and to cause communication between the conduits 110 and 113 whereby fuel delivered through the opened valve seat 67a flows to the controlled pilot burner 95a of the broil burner 13a and is ignited by the thus energized ignition coil 88a.

After the fuel issuing from the controlled pilot burner 45a has been ignited by the coil 88a, the sensing bulb 43a of the safety valve 30a senses the flame at the controlled pilot burner 45a and causes the safety valve 30a to open to permit fuel from the fuel conduit 22a to be interconnected to the broil burner 13a and be ignited by the controlled pilot burner 45a.

Upon the opening of the broil burner safety valve 30a, the switch arm 91a is moved away from the contacts 90a and 93a to terminate operation of the ignition coil 88a. Simultaneously with the opening of the safety valve 30a, the valve member 54a of the valve 49a opens interconnecting the source of fuel with the standby pilot burner 46a whereby the standby pilot burner 46a functions in the manner previously described to prevent an explosive condition existing at the broil burner 13a should the selector knob 59a be manipulated in the maner previously described.

Assuming that it is desired to utilize a rotisserie in the oven 11a whereby it is necessary to maintain the temperature of the oven 11a at a temperature below the normal broiling temperature while still utilizing the broil burner 13a, the operator of the fuel control system 104 turns the selector knob 59a to the selected temperature, such as 300° F. to 400° F., as desired, whereby the brake burner 12a would operate in the above manner.

However, the operator also then moves the switch 126 from the position illustrated in the drawings to the position wherein the arm 127 thereof makes contact with the contact 125 and the arm 128 thereof makes contact with the contact 136.

In this manner, the rotisserie motor 123 is placed across the contacts $L_1$ and $L_2$ of the electrical power source by the switch arm 128 while the switch arm 127 places the ignition coil 88a and heater coil 152 across the contacts $L_1$ and $L_2$ of the electrical power source since the arm 142 of the switch 141 is disposed against the contact 140 because the control knob 59a is disposed in a bake "on" position thereof.

Thus, it can be seen that when the switch 126 is moved in the above manner, the heater coil 152 is operated to move the valve member 114 to close the valve seat 109 and open the valve seat 112 so that fuel can be directed to the controlled pilot burner 45a while communication between the source of fuel and the controlled pilot burner 19a is terminated.

Therefore, it can be seen that the broil burner 13a will be turned on and that the flame thereof will be thermostatically controlled by the valve member 73a in response to the temperature of the oven 11a as sensed by the bulb 81a so that the rotisserie can be utilized at a relatively low oven temperature while the food can be cooked by the broil burner 13a.

Figure 6:
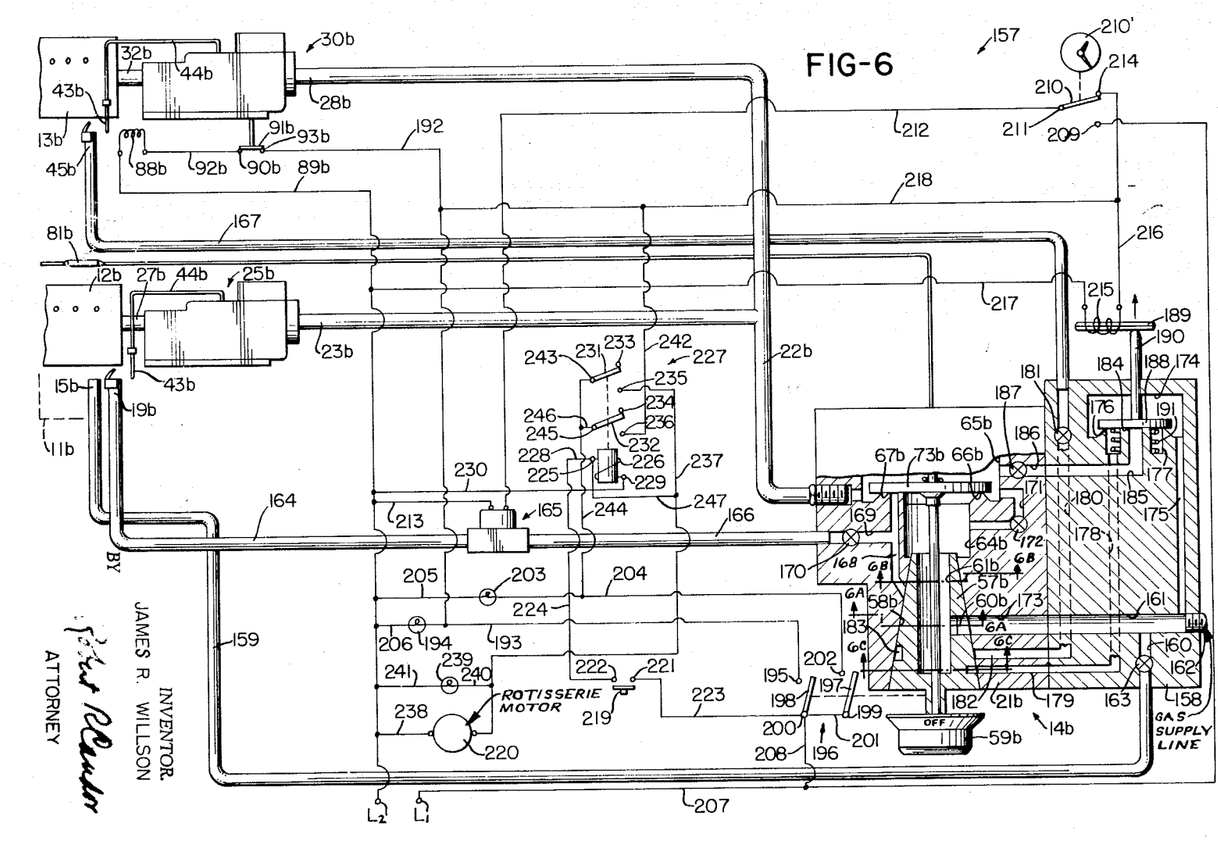
FIGURE 6 is a schematic view illustrating another fuel control system of this invention.
Figure 6A:
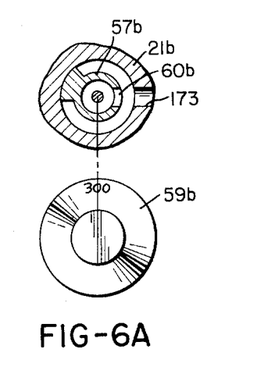
FIGURE 6A is a view similar to FIGURE 1A and is taken on line 6A—6A of FIGURE 6.
Figure 6B:
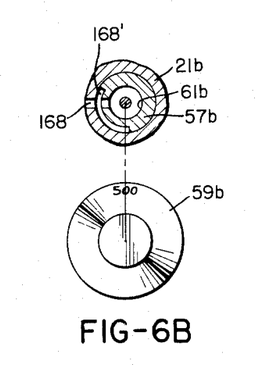
FIGURE 6B is a view similar to FIGURE 6A and is taken on line 6B—6B of FIGURE 6.
Figure 6C:
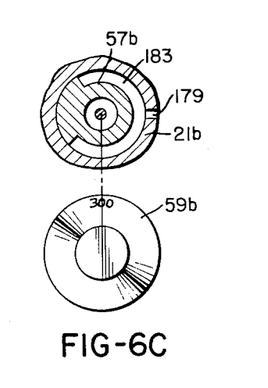
FIGURE 6C is a view similar to FIGURE 6A and is taken on line 6C—6C of FIGURE 6.

Another fuel control system of this invention is generally indicated by the reference numeral 157 in FIGURE 6 and parts thereof similar to the fuel control system 10 are indicated by like reference numerals followed by the reference letter "b."

The fuel control system 157 includes a bake burner 12b interconnected to the outlet side of the bake burner safety valve 25b by the conduit 27b, the inlet side of the safety valve 25b being interconnected to the branch conduit 23b which is interconnected to the fuel conduit 22b leading from the selector valve 14b.

Similarly, the broil burner 13b is interconnected to the outlet side of the broil burner safety valve 30b by the conduit 32b, the inlet side of the safety valve 30b being interconnected to the end 28b of the fuel conduit 22b.

The standby pilot burner 15b of the brake burner 12b is interconnected to a valve housing 158 of the selector valve 14b by a conduit 159, the conduit 159 being interconnected to a passage 160 formed in the housing 158 and interconnected to a fuel passage 161 formed in the housing 158. The fuel passage 161 is, in turn, interconnected to a fuel source conduit or manifold 162. The passage 160 has a suitable adjusting valve 163 disposed therein to adjust the flow of fuel to the standby pilot burner 15b whreby a flame continuously appears at the standby pilot burner 15b.

The controlled pilot burner 19b of the bake burner 12b is interconnected to a conduit 164 leading to the outlet side of a normally opened solenoid operated valve 165.

The inlet side of the normally opened solenoid valve 165 is interconnected to the housing 21b of the selector valve 14b by a conduit 166, the housing 21b and 158 of the selector valve 14b being suitably interconnected together.

The controlled pilot burner 45b of the broil burner 13b is interconnected to the housing 158 of the selector valve 14b by a conduit 167, the broil burner 13b not having any standby pilot burner as in the other embodiments of this invention.

The housing 21b of the selector valve 14b has the chambers 64b and 65b thereof separated by the annular valve seat 66b in the manner previously described, the smaller annular valve seat 67b being disposed in the same plane as the valve seat 66b whereby the thermostatically controlled valve member 73b simultaneously opens and closes the valve seats 66b and 67b.

The valve seat 67b is interconnected to a passage 168 formed in the housing 21b and leading to the bore 58b of the housing 21b, the passage 168 being aligned with a slot 168' formed in the valve member 57b to interconnect the passage 168 with the bore 61b of the valve member 57b when the control knob 59b is disposed in the bake position thereof between the 325° F. and 550° F. settings for a purpose hereinafter described.

The passage 168 is interconnected to a branch passage 169 formed in the housing 21b and interconnected to the conduit 166, the passage 169 having a suitable adjusting valve 170 disposed therein.

A bypass passage 171 is formed in the housing 21b and interconnects the chamber 64b with the chamber 65b, the bypass passage 171 having a suitable adjusting valve 172 disposed therein.

The passage 161 formed in the housing 158 is aligned with a passage 173 formed in the housing 21b, the passage 173 being aligned with the slot 60b formed in the valve member 57b which interconnects the source of fuel 162 with the bore 61b of the valve member 57b when the valve member 57b is disposed in any "on" position thereof.

The housing 158 is provided with a chamber 174 disposed in continuous communication with the fuel passage 161 by a passage 175.

An annular valve seat 176 is provided by the housing 158 and separates the chamber 174 thereof from an annular chamber 177, the annular chamber 177 being interconnected to a passage 178 formed in the housing 158 and interconnected to a passage 179 formed in the housing 21b.

A passage 180 is formed in the housing 158 and is interconnected to the conduit 167 leading to the controlled pilot burner 45b of the broil burner 13b, the passage 180 having a suitable adjusting valve 181 disposed therein. The passage 180 is, in turn, interconnected to a passage 182 formed in the housing 21b and leading to the bore 58b thereof.

The valve member 57b of the selector valve 14b is provided with a groove 183 which interconnects the passages 179 and 182 together when the control knob 59b of the selector knob 14b is disposed in any "on" position thereof for a purpose hereinafter described.

An annular valve seat 184 is provided by the housing 158 and is concentrically disposed within the valve seat 176 thereof and disposed in the same plane therewith, the valve seat 184 being interconnected to a passage 185 formed in the housing 158 and aligned with a passage 186 formed in the housing 21b. The passage 186 formed in the housing 21b leads to the chamber 65b thereof and has an adjusting valve 187 provided therein.

A movable valve member 188 is disposed in the chamber 174 and is normally urged against the valve seats 176 and 184 by a bi-metal member 189 pushing against a stem 190 carried by the valve member 188. A compression spring 191 is disposed in the annular chamber 177 and tends to push the valve member 188 away from the valve seats 176 and 184. However, the bi-metal member 189, when unheated, overcomes the force of the compression spring 191 to maintain the valve member 188 in the closed position thereof as illustrated in FIGURE 6.

The ignition coil 88b for the broil burner 13b has one side thereof interconnected to the contact $L_2$ of an electrical power source by a lead 89b, the other side of the ignition coil 88b being interconnected to the contact 90b of the switch arm 91b by a lead 92b.

The other contact 93b of the switch arm 91b is interconnected to a lead 192, the lead 192 being interconnected to a lead 193 which interconnects one side of a broil burner indicating light 194 with a contact 195 of a switch 196.

The switch 196 includes a pair of contact arms 197 and 198 respectively interconnected together at the fixed contacts 199 and 200 thereof by a lead 201.

The switch 196 is so constructed and arranged that the arm 197 thereof is moved against a contact 202 when the control knob 59b is moved to any bake "on" position and is moved out of contact with the contact 202 when the control knob 59b is disposed in the "off" or "broil" positions thereof.

The contact arm 198 is interconnected to the control knob 59b in such a manner that the contact arm 198 makes contact with the contact 195 only when the control knob 59b is disposed in the "broil" position thereof.

The contact 202 of the switch 196 is interconnected to one side of a bake indicating light 203 by a lead 204, the other side of the bake indicating light 203 being interconnected to the lead 89b by a lead 205. Similarly, the other side of the broil indicating light 194 is interconnected to the lead 89b by a lead 206.

The contact 200 of the switch 196 is interconnected to a lead 207 by a lead 208, the lead 207 being interconnected at one end thereof to the contact $L_1$ of the electrical power source and to a contact 209 of a clock operated switch arm 210.

The clock operated switch arm 210 has a fixed contact 211 thereof interconnected to one side of the coil of the solenoid valve 165 by a lead 212, the other side of the coil of the solenoid valve 165 being interconnected to the lead 89b by a lead 213.

The switch arm 210 is normally disposed against a contact 214 which is interconnected to one side of a bimetal heater coil 215 by a lead 216, the other side of the heater coil 215 being interconnected to the lead 89b by a lead 217.

The lead 216 is also interconnected to the lead 192 by a lead 218.

A manually operated switch 219 is adapted to energize a rotisserie motor 220 in a manner hereinafter described when the switch 219 is moved against the contacts 221 and 222, the contact 221 being interconnected to the contact 200 of the switch 196 by a lead 223. The contact 222 of the switch 219 is interconnected to a lead 228 by a lead 224.

The lead 224 is thus interconnected to one side 225 of a solenoid coil 226 of a double throw switch 227 by the lead 228, the other side 229 of the solenoid coil 226 being interconnected to the lead 89b by a lead 230.

The switch 227 comprises a pair of contact arms 231 and 232 normally disposed against contacts 233 and 234 when the coil 226 is not energized. When the coil 226 is energized in a manner hereinafter described, the contact arms 231 and 232 respectively move into contact with contacts 235 and 236, the contact 235 being interconnected to one side of a rotisserie motor 220 by a lead 237 with the other side of the rotisserie motor 220 being interconnected to the lead 89b by a lead 238.

A rotisserie indicating light 239 has one side thereof interconnected to the lead 237 by a lead 240 and the other side thereof interconnected to the lead 89b by a lead 241.

The contact 236 of the switch 227 is interconnected to the lead 218 by a lead 242.

A fixed contact 243 of the switch arm 231 is interconnected to the lead 204 by a lead 244. A fixed contact 245 of the switch arm 232 is interconnected to the lead 244 by a lead 246.

The lead 237 is also interconnected to the side 225 of the solenoid coil 226 by a lead 247 to provide a holding circuit for the switch 227.

The operation of the fuel control system 157 of this invention will now be described.

Assuming that it is desired to maintain the oven 11b at a low non-cooking temperature such as between 140° F. and 325° F., the control knob 59b is rotated to the selected temperature, such as 200° F. whereby the valve member 73b of the selector valve 14b is moved away from the valve seats 66b and 67b to permit gas to not only flow from the source 162 to the fuel conduit 22b but also to flow through the passage 168, branch passage 169, conduit 166, normally opened valve 165 and conduit 164 to the controlled pilot burner 19b whereby the fuel issuing from the controlled pilot burner 19b is ignited by the continuously burning standby pilot burner 15b.

When a flame appears at the controlled pilot burner 19b, the sensing bulb 43b of the bake burner safety valve 25b causes the valve 25b to open to interconnect the source of fuel with the bake burner 12b whereby the fuel issuing from the bake burner 12b is ignited by the standby pilot burner 15b and/or the controlled pilot burner 19b.

When the temperature of the oven 11b reaches the selected temperature or exceeds the same, the valve member 73b, under the control of the sensing bulb 81b, is moved against the valve seats 66b and 67b to prevent fuel from issuing from the controlled pilot burner 19b whereby the safety valve 25b closes to terminate operation of the bake burner 12b.

When the temperature of the oven 11b falls below the selected temperature, the sensing bulb 81b causes the valve member 73b to move away from the valve seats 66b and 67b whereby a flame will again appear at the controlled pilot burner 19b to open the safety valve 25b in the above manner.

When it is desired to maintain the oven 11b at a high cooking temperature, such as between 325° F. and 550° F., the control knob 59b is rotated to the selected temperature, such as 400° F. whereby the slot 168' in the valve member 57b interconnects the bore 61b thereof with the passage 168 so that fuel is continuously supplied to the controlled pilot burner 19b regardless of the position of the valve member 73b in order to maintain the safety valve 25b in the opened position thereof. However, fuel delivered to the bake burner 12b is controlled by the position of the valve member 73b so that the temperature of the oven 11b can be maintained at the selected temperature by the thermostatically controlled valve member 73b.

During the baking operations of the fuel control system 157, the control knob 59b closes the switch arm 197 of the switch 196 against the contact 202 whereby the bake indicating light 203 is placed across the contacts $L_1$ and $L_2$ of the electrical power source.

When the control knob 59b is set for a baking operation and the automatic clock 210' is set to terminate the baking operation at a selected time, the clock 210' moves the switch arm 210 away from the contact 214 into contact with the contact 209 at the selected time whereby the solenoid operated valve 165 is placed across the contacts $L_1$ and $L_2$ of the electrical power source to cause the valve 165 to close and thereby prevent communication between the source of fuel 162 and the controlled pilot burner 19b so that the bake burner 12b cannot be thereafter operated until the switch arm 210 is moved back to the position illustrated in FIGURE 6.

When it is desired to operate the broil burner 13b, the control knob 59b of the selector valve 14b is moved to the "broil" position thereof whereby the switch arm 198 of the switch 196 is closed against the contact 195 to not only place the broil indicating light 194 across the contacts $L_1$ and $L_2$ of the electrical power source but to also place the coil of the solenoid valve 165 as the switch arm 210 is disposed against contact 214, the ignition coil 88b and the heater coil 215 across the contacts L₁ and L₂ of the electrical power source.

When the heater coil 215 is energized in the above manner, the bi-metal member 189 moves away from the housing 158 to permit the valve member 188 to move away from the valve seats 176 and 184 by the force of the compression spring 191 to interconnect the chamber 174 with the chamber 177 whereby fuel from the passage 175 can flow from the chamber 174 through the passages 178 and 179, groove 183 of the valve member 57b, passages 182 and 180 and conduit 167 to the controlled pilot burner 45b of the broil burner 13b.

In this manner, fuel is continuously supplied to the controlled pilot burner 45b from the source 162 regardless of the position of the valve member 73b as long as the valve member 188 remains in its opened position thereof.

When the switch arm 198 of switch 196 is moved against the contact 195, the ignition coil 88b is placed across the contacts L₁ and L₂ of the electrical power source whereby the ignition coil 88b ignites the fuel issuing from the controlled pilot burner 45b.

The flame appearing at the controlled pilot burner 45b is sensed by the bulb 43b of the broil burner safety valve 30b to open the safety valve 30b to interconnect the source of fuel with the broil burner 13b.

The broil burner 13b continues to operate as long as the selector knob 59b is disposed in the "broil" position thereof.

However, should the valve 59b be turned to an "off" position thereof to terminate the supply of fuel to the controlled pilot burner 45b and to the broil burner 13b through the valve seat 66b and be, thereafter, turned to any "on" position to again permit fuel to be delivered to the broil burner 13b before the safety valve 30b can close, the valve member 188 prevents an explosive condition from existing at the broil burner 13b.

For example, the bi-metallic member 189 is so constructed and arranged that the same has a greater time lag in closing the valve member 188 after the heater coil 215 is de-energized than the time lag of the closing of the safety valve 30b whereby fuel is continuously supplied to the broil burner 13b by the passage means 175 through the opened valve seat 184, passages 185 and 186, chamber 65b of the selector valve 14b and the conduit 22b so that fuel will be continuously supplied to the broil burner 13b as long as the safety valve 30b remains open. Since the broil burner 13b does not stop burning until the safety valve 30b is closed, it makes no difference that the controlled pilot burner 45b no longer has a flame. After the safety valve 30b has closed, then the bi-metallic member 189 closes the valve 188 terminating operation of the broil burner 13b.

Therefore, it can be seen that the fuel control system 157 prevents an explosive condition at the broil burner 13b should control knob 59b be operated in the above manner.

When it is desired to operate a rotisserie disposed in the oven 11b in the conventional manner by utilizing the broil burner 13b and maintaining the temperature of the oven 11b at a selected temperature below that provided by the selector valve 14b when the control knob 59b is disposed in the "broil" position thereof, the control knob 59b is rotated to any selected temperature, such as 350° F. whereby the bake burner 12b is operated in the above manner.

However, the operator closes the switch 219 against the contacts 221 and 222 to place the solenoid coil 226 of the switch 227 across the contacts L₁ and L₂ of the electrical power source to move the switch arms 231 and 232 respectively against the contacts 235 and 236.

Movement of the switch arm 231 against the contact 235 provides a holding circuit across the contacts L₁ and L₂ to maintain the solenoid coil 226 energized even though the switch arm 219 is again opened because the switch arm 197 is disposed against the contact 202 when the selector knob 59b is disposed in bake "on" position.

Also, movement of the switch arm 231 against the contact 235 places the rotisserie motor 220 and rotisserie indicating light 239 across the contacts L₁ and L₂ of the electrical power source while the switch arm 232 places the ignition coil 88b, the coil of the solenoid valve 165 and the heater coil 215 across the contacts L₁ and L₂ of the electrical power source to cause the broil burner 13b to operate in the above manner and prevent operation of the bake burner 12b.

However, the valve member 73b thermostatically controls the amount of fuel being supplied to the broil burner 13b over and above the amount of fuel being supplied thereto by the opened valve seat 184 and bypass passage 171 so that the temperature of the oven 11b can be maintained at the selected temperature.

Therefore, it can be seen that improved fuel control systems are provided by this invention which permit operation of a double burner oven by a single selector valve.

In addition, this invention provides an easy to operate compact fuel control system in which two burners are controlled from a single dial in an inexpensive manner, the system providing readily accessible adjustments.

While the form of the invention now preferred has been disclosed as required by the statutes, other forms may be used, all coming within the scope of the claims which follow.

What is claimed is:

1. In combination, a source of fuel, a bake burner having a pilot burner, a broil burner having a pilot burner, and a selector valve being movable in one direction from an off position through a bake range to a broil position, said selector valve selectively interconnecting said source of fuel to one of said bake and broil burners, said selector valve also selecting the desired temperature setting for said bake burner when said selector valve interconnects said source of fuel to said bake burner, said selector valve including a thermostatically operated valve for thermostatically controlling the flow of fuel to said bake burner.

2. A combination as set forth in claim 1 wherein ignition means are provided for said pilot burners.

3. In combination, a source of fuel, a bake burner having a pilot burner, a broiler burner having a pilot burner, and a selector valve being movable in one direction from an off position through a bake range to a broil position, said selector valve selectively interconnecting said source of fuel to one of said bake and broil burners and to its respective pilot burner, said selector valve also selecting the desired temperature setting of said bake burner when said selector valve interconnects said source of fuel to said bake burner and its respective pilot burner, said selector valve including a thermostatically operated valve for thermostatically controlling the flow of fuel to said bake burner.

4. In combination, a source of fuel, a bake burner having a pilot burner, a broil burner having a pilot burner, and a selector valve being movable in one direction from an off position through a bake range to a broil position, said selector valve selectively interconnecting said source of fuel to one of said bake and broil burners and to its respective pilot burner, said selector valve also selecting the desired temperature setting for said bake burner when said selector valve interconnects said source of fuel to said bake burner and its respective pilot burner, said selector valve including a thermostatically operated valve for thermostatically controlling the flow of fuel to said bake burner and its respective pilot burner.

5. In combination, a source of fuel, a bake burner having a pilot burner, a broil burner having a pilot burner, and a selector valve being movable in one direction from an off position through a bake range to a broil position, said selector valve selectively interconnecting said source of fuel to one of said bake and broil burner and to its respective pilot burner, said selector valve also selecting the desired temperature setting for said bake burner when said selector valve interconnects said source of fuel to said bake burner and its respective pilot burner, said selector valve including a thermostatically operated valve for controlling the flow of fuel to one of said bake and broil burners.

6. In combination, a source of fuel, a bake burner having a bake pilot burner, a broil burner having a broil pilot burner, a bake burner valve for interconnecting said source of fuel to said bake burner when a flame appears at said bake pilot burner, a broil burner valve for interconnecting said source of fuel to said broil burner when a flame appears at said broil pilot burner, and a selector valve being movable in one direction from an off position through a bake range to a broil position, said selector valve selectively controlling the flow of fuel to said bake and broil burners, said selector valve also selecting the desired temperature setting for said bake burner when said selector valve interconnects said source of fuel to said bake burner, said selector valve including a thermostatically operated valve for thermostatically controlling the flow of fuel to said bake burner.

7. In combination, a source of fuel, a bake burner having a pilot burner, a broil burner having a pilot burner, a bake burner valve for interconnecting said source of fuel to said bake burner when a flame appears at said bake pilot burner, a broil burner valve for interconnecting said source of fuel to said broil burner when a flame appears at said broil pilot burner, ignition means for igniting said broil pilot burner, said ignition means only being operable when said broil burner valve is in the closed position thereof, and a selector valve for selectively controlling the flow of fuel to said pilot burners.

8. A combination as set forth in claim 7 wherein means are provided for selectively directing the flow of fuel from said bake pilot burner to said broil pilot burner even though said selector valve is tending to direct the flow of fuel from said source to said bake pilot burner.

9. In combination, a source of fuel, a bake burner having a pilot burner, a broil burner having a pilot burner, a selector valve, said selector valve interconnecting said source of fuel to said bake burner and its respective pilot burner when said selector valve is in one position thereof, said selector valve interconnecting said source of fuel to said broil burner and its respective pilot burner when said selector valve is in another position thereof, and valve means for selectively interconnecting said source of fuel to only said broil burner and its respective pilot burner when said selector valve is in said one position thereof.

10. In combination, a source of fuel, a bake burner having a bake pilot burner, a broil burner having a broil pilot burner, a bake burner valve for interconnecting said source of fuel to said bake burner when a flame appears at said bake pilot burner, a broil burner valve for interconnecting said source of fuel to said broil burner when a flame appears at said broil pilot burner, a selector valve upstream from said burner valves, said selector valve interconnecting said source of fuel to said bake pilot burner when said selector valve is in one position thereof, said selector valve interconnecting said source of fuel to said broil pilot burner when said selector valve is in another position thereof, and valve means downstream from said selector valve for selectively diverting the entire flow of fuel to said bake pilot burner to said broil pilot burner even though said selector valve is in said one position thereof.

11. In combination, an oven, a bake burner disposed in said oven, a broil burner disposed in said oven, a selector valve, said selector valve interconnecting a source of fuel to said bake burner when said selector valve is in one position thereof, said selector valve interconnecting said source of fuel to said broil burner when said selector valve is in another position thereof, and selectively operable means for causing said source of fuel to be only interconnected to said broil burner even though said selector valve is in said one position thereof.

References Cited by the Examiner

UNITED STATES PATENTS

| | | | |
|---|---|---|---|
| 1,704,807 | 3/1929 | O'Neal | 236—21 |
| 1,844,959 | 2/1932 | Hulse. | |
| 2,051,401 | 8/1936 | Winterstein | 236—15 |
| 2,079,504 | 5/1937 | Hobson | 236—15 |
| 2,303,011 | 11/1942 | Weber et al. | |
| 2,610,682 | 9/1952 | Weber | 158—126 X |
| 2,639,765 | 5/1953 | Hollman | 158—133 |
| 2,729,286 | 1/1956 | Strobel | 158—133 |
| 2,787,948 | 4/1957 | Mathis | 99—421 |
| 2,791,212 | 5/1957 | Hollman et al. | 126—39 |
| 3,065,912 | 11/1962 | Holzboog et al. | 236—68 |

FOREIGN PATENTS 1,235,208    5/1960    France.

WILLIAM F. O'DEA, *Primary Examiner.*

ALDEN D. STEWART, EDWARD J. MICHAEL,
*Examiners.*